United States Patent
Chen et al.

(10) Patent No.: US 11,066,781 B2
(45) Date of Patent: Jul. 20, 2021

(54) PRETREATMENT FOR APPLICATION ONTO FINISHED COTTON FABRIC

(71) Applicant: EASTERN TECH LLC, Orange, CT (US)

(72) Inventors: Christopher Chen, Wallingford, CT (US); James DeMarco, Hamden, CT (US); Shawn Liu, Orange, CT (US); Gerald Cantalupo, Jr., Toms River, NJ (US)

(73) Assignee: EASTERN TECH LLC, Orange, CT (US)

( * ) Notice: Subject to any disclaimer, the term of this patent is extended or adjusted under 35 U.S.C. 154(b) by 0 days.

(21) Appl. No.: 16/279,156

(22) Filed: Feb. 19, 2019

(65) Prior Publication Data

US 2019/0257030 A1    Aug. 22, 2019

Related U.S. Application Data

(60) Provisional application No. 62/632,488, filed on Feb. 20, 2018.

(51) Int. Cl.

| | |
|---|---|
| *B41J 3/407* | (2006.01) |
| *B41M 5/00* | (2006.01) |
| *D06P 5/00* | (2006.01) |
| *C09D 11/033* | (2014.01) |
| *C09D 11/10* | (2014.01) |
| *C09D 11/54* | (2014.01) |
| *D06P 1/673* | (2006.01) |
| *D06P 1/54* | (2006.01) |
| *D06P 1/52* | (2006.01) |
| *D06P 5/30* | (2006.01) |

(52) U.S. Cl.
CPC .............. *D06P 5/002* (2013.01); *B41J 3/4078* (2013.01); *B41M 5/0017* (2013.01); *C09D 11/033* (2013.01); *C09D 11/10* (2013.01); *C09D 11/54* (2013.01); *D06P 1/525* (2013.01); *D06P 1/5221* (2013.01); *D06P 1/5228* (2013.01); *D06P 1/5235* (2013.01); *D06P 1/5285* (2013.01); *D06P 1/54* (2013.01); *D06P 1/67333* (2013.01); *D06P 5/30* (2013.01)

(58) Field of Classification Search
CPC .. B41J 3/4078; B41J 11/0015; B41M 5/0011; B41M 5/0017; D06P 5/002; D06P 1/67333; D06P 1/54; D06P 1/5285; D06P 1/525; D06P 5/30; D06P 1/5228; D06P 1/5235; D06P 1/5221; C09D 11/033; C09D 11/10; C09D 11/54
See application file for complete search history.

(56) References Cited

U.S. PATENT DOCUMENTS

| | | | |
|---|---|---|---|
| 4,702,742 A | 10/1987 | Iwata et al. | |
| 4,997,450 A | 3/1991 | Olson et al. | |
| 5,667,533 A | 9/1997 | Hauser et al. | |
| 9,528,215 B2 | 12/2016 | Tumini et al. | |
| 2011/0242189 A1 | 10/2011 | Okada et al. | |
| 2011/0293898 A1 | 12/2011 | Yatake et al. | |
| 2015/0299948 A1 | 10/2015 | Pan et al. | |
| 2015/0375528 A1* | 12/2015 | Kitagawa | D06P 1/44 428/196 |
| 2016/0024709 A1 | 1/2016 | Walker | |
| 2016/0032523 A1* | 2/2016 | Liu | D06P 5/30 347/21 |
| 2017/0058453 A1 | 3/2017 | Pan et al. | |
| 2019/0127909 A1 | 5/2019 | Chastain et al. | |
| 2020/0115841 A1 | 4/2020 | Chen et al. | |

FOREIGN PATENT DOCUMENTS

| | | |
|---|---|---|
| GB | 2458719 A | 9/2009 |
| JP | 2009249773 A | 10/2009 |

OTHER PUBLICATIONS

Tonello, "Advanced technology for sampling" Oct. 2014, 4 pages.
Tonello, "Operation and Maintenance Instruction Manual: Dyeing Machine for Sampling G1 30", Sep. 1997, 94 pages.
Firebird Industrial Processing, Industrial Tube Dryer, 75 Pound (34 Kilogram) Capacity, Model: FBD075X01, Intallation, 2019, 71 pages.
Firebird Industrial Processing, Washer-Extractor with Re-Use Tank, Model: FBW065X01, Hardmount Design 5, Installation/Operation/Maintenance, 2019, 56 pages.
Machine Translation of Japanese Publication No. 2009249773, Publication date Oct. 29, 2009, 3 pages.
International Search Report issued in Application No. PCT/US2019/018528 dated May 17, 2019, 6 pages.
Written Opinion issued in Application No. PCT/US2019/018528 dated May 17, 2019, 8 pages.

\* cited by examiner

*Primary Examiner* — Scott A Richmond
(74) *Attorney, Agent, or Firm* — Cantor Colburn LLP

(57) ABSTRACT

Disclosed is a process for printing on cotton fabric comprising (1) contacting cotton fabric with an aqueous solution comprising (A) 40% to 70% by weight of at least one multivalent cationic salt; (B) optionally 0.1% to 5% by weight of a blocked isocyanate crosslinking agent, and (C) 3% to 40% by weight of a waterborne resin, all percentages based on the weight of the aqueous solution; (2) drying the cotton fabric to remove the water from the cotton fabric; and (3) digitally printing the pretreated and coated cotton fabric with a water-based textile ink.

28 Claims, No Drawings

PRETREATMENT FOR APPLICATION ONTO FINISHED COTTON FABRIC

CROSS-REFERENCE TO RELATED APPLICATIONS

This application claims the benefit of U.S. Provisional Patent Application Ser. No. 62/632,488 filed Feb. 20, 2018, which is incorporated herein by reference in its entirety.

BACKGROUND

Presently, Direct-To-Garment (DTG) printing onto cotton fabrics is typically preceded by pretreatment steps that include spraying pretreatment solutions onto finished cotton garments. Without such pretreatment, DTG printed fabrics may suffer from easily faded graphics after wash or not retain the ink on the fabric altogether. However, pretreatment processes can be labor and machine-intensive in that personnel are required to operate the pretreatment machines, properly utilize a heat press/conveyor to dry the fabrics, as well as requiring a detailed knowledge of the proper amounts of pretreatment to apply, for example. These additional steps increase the complexity and cost of producing DTG cotton fabrics. Additionally, there is a need to print onto cotton fabrics that results in a lasting, wash resistant image that does not substantially change the visual appearance of the fabric (e.g., make a shirt stiffer and/or discolored).

BRIEF DESCRIPTION

One embodiment is directed to a process for printing on cotton fabric comprising (1) contacting cotton fabric with an aqueous solution comprising (A) 40% to 70% by weight of at least one multivalent cationic salt; (B) optionally 0.1% to 5% by weight of a blocked isocyanate crosslinking agent, and (C) 3% to 40% by weight of a waterborne resin, all percentages based on the weight of the aqueous solution; (2) drying the cotton fabric to remove the water from the cotton fabric; and (3) digitally printing the pretreated and coated cotton fabric with a water-based textile ink.

Another embodiment is directed to an aqueous solution for the pretreatment of cotton fabrics comprising A) 40% to 70% by weight of at least one multivalent cationic salt; (B) optionally 0.1% to 5% by weight of a blocked isocyanate crosslinking agent, and (C) 3% to 40% by weight of a waterborne resin, all percentages based on the weight of the aqueous solution.

Still another embodiment is directed to a concentrated pretreatment solution comprising a mixture of 40 parts to 70 parts by weight of at least one multivalent cationic salt, optionally 0.1 parts to 5 parts by weight a blocked isocyanate crosslinking agent, and 3 parts to 40 parts by weight of a waterborne resin.

The above described and other features are exemplified by the detailed description.

DETAILED DESCRIPTION

The embodiments for digitally printing cotton fabrics described herein have many advantages over the processes suggested in the past. In these embodiments, the ink has good adhesion to the cotton. The printing has excellent vibrancy. In summary, printed cotton fabrics made by these embodiments have a lasting, wash resistant image that does not substantially change the visual appearance of the fabric.

The term "cotton fabric" as used in the present specification and claims means any cotton fabric, or any portion thereof, that this capable of being digitally printed, especially by a DTG digital printing process. Such cotton garments include 100% cotton garments as well as cotton blend garments, such as those comprising of 98% cotton and 2% polyester. Other useful cotton garments can incorporate viscose, rayon, nylon and other synthetic and fibers.

Some embodiments of digital printable cotton fabrics used in this way are clothes, particularly t-shirts. Other embodiments of digital printable cotton fabrics include canvas bags, signage, and promotional goods.

The present cotton fabric pretreatment solution is an aqueous solution of selected amounts of at least three components, namely, at least one multivalent cationic salt; a blocked isocyanate crosslinking agent, and a waterborne resin. The pretreatment solution can also contain selected amounts of other optional ingredients, namely, vinyl polymer, other resins, solvents/penetrants, humectants and finishing agents such as fragrances, surfactants, preservatives, biocides, dyes and rheology modifiers.

The at least one multivalent cationic salt can include any salt wherein the multivalent cation comprises one or more of the group of multivalent cations of elements Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb. "Multivalent" indicates an oxidation state of two or more and, for an element "Z", are typically described as $Z^{2+}$, $Z^{3+}$, $Z^{4+}$ and so forth. For brevity, multivalent cations may be referred to herein as ZX. The multivalent cations are substantially soluble in the aqueous pretreatment solution and preferably exist (in solution) in a substantially ionized state so that they are in a form where they are free and available to interact with textile when the textile is exposed to the pretreatment solution. Any suitable divalent salt can be used. Calcium is a particularly useful multivalent cation for many present embodiments.

For many embodiments, the at least one multivalent cationic salt is chosen from the group consisting of calcium nitrate, calcium nitrate hydrate, calcium nitrate tetrahydrate, calcium ammonium nitrate, calcium chloride or other soluble calcium sates, or a combination comprising at least one of the foregoing. Calcium nitrate tetrahydrate is particularly useful because of cost, performance and availability considerations.

For some embodiments, at least one multivalent cationic salt is 40% to 70% by weight of the aqueous pretreatment solution. Calcium nitrate tetrahydrate can be used in amounts from 47% to 62%, more preferably 50% to 60%, by weight of the aqueous pretreatment solution, based on the weight of the aqueous solution, in some embodiments.

The term "blocked isocyanate crosslinking agent" as used in the present specification and claims means any blocked isocyanate or polyisocyanate crosslinking agent that can be used in a digital printing process with cotton fabric. For some embodiments, the isocyanate group in the blocked isocyanate crosslinking agent can be a blocked di-polyisocyanate, or a blocked tri-polyisocyanate, and combinations thereof.

For some embodiments, the isocyanate group in the blocked isocyanate crosslinking agent can a trifunctional trimethylolpropane (TMP) of tolune diisocyanate (TDI); hexamethylene diisocyanate (HDI), hydrogenated xylylene diisocyanate (H6XDI), isophorone diisocyanate (IPDI), or dicyclohexylmethane diisocyanate ($H_{12}$MDI), or a combination comprising at least one of the foregoing.

For some embodiments, the blocking agent can be diethyl malonate (DEM), diisopropyl amine (DIPA), 1,2,4-triazol (TRIA), 3,5-dimethylpyrazol (DMP) and butanoneoxime (MEKO).

For some embodiments, the blocked isocyanate crosslinking agent is a blocked aliphatic isocyanate.

Examples of commercial blocked isocyanate crosslinking agent products include Rudolf-Venture Chemical Ruco-Guard XCR, Ruco-Guard TIE or Ruco-Link 3109.

For some embodiments, the amount of the optional blocked isocyanate crosslinking agent is 0.1% to 5%, preferably, 1% to 4%, by weight, based on the weight of the aqueous solution. The preferred embodiment being 2.5% by weight Ruco-Guard XCR.

The term "waterborne resin" as used in the present specification and claims means any aqueous resin dispersion or emulsion that can be used in a digital printing process with cotton fabric. For some embodiments, the waterborne resin is an acrylic resin or latex or emulsion, a urethane resin or emulsion, an acrylic-vinylidene chloride copolymers, a styrene butadiene rubber latex, an acrylic styrene emulsion, a vinyl acrylic emulsion, a vinyl acetate ethylene (VAE) copolymer emulsion or combinations of one or more of the foregoing. An example of a suitable waterborne resin that could be used in the present invention is NeoRez R-960 from DSM Coating Resins LLC. The waterborne resin is preferably salt stable and washes well. The use of waterborne resin such as aqueous resin dispersions can improve the wash resistance of printed inks.

For some embodiments, the amount of the waterborne resin is 3% to 40%, preferably 4% to 25%, by weight, based on the weight of the aqueous solution.

In some optional embodiments, a vinyl polymer may be additionally present. The vinyl polymer may be any vinyl polymer product that provides adhesion to the cotton fabric. For some embodiments, the vinyl polymer is poly(vinyl alcohol ethylene); polyvinyl acetate; polyvinyl alcohol polymer; or a combination of one or more the foregoing. Commercial products that contain vinyl polymers that can be used herein include Elmer's School Glue, Elmer's Glue-all, Elmer's School Glue Gel, Kuraray Exceval HR-3010, Kuraray Exceval RS-2117, Kuraray Exceval RS-1717 or Kuraray Exceval AQ-4104. The amount of the vinyl polymer is 0.1% to 10% by weight, based on the weight of the aqueous solution. In other embodiments, the amount of the vinyl polymer is 0.1% to 5% by weight, based on the weight of the aqueous solution. The preferred embodiment being 6% by weight Elmer's Glue-All.

In some other optional embodiments, the aqueous pretreatment solution further comprises at least one organic solvent/penetrant. In some embodiments, the at least one organic solvent/penetrant is a mixture of propylene glycol methyl ether and dipropylene glycol methyl ether. Other suitable solvent/penetrant can be almost any miscible solvent including ethanol, ethylene glycol, propylene glycol or acetone.

If used, the amount of the propylene glycol methyl ether can be 0.1% to 1% by weight of the pretreatment solution and the amount of the dipropylene glycol methyl ether can be 0.5% to 1.5% by weight of the pretreatment solution.

In some other optional embodiments, the aqueous pretreatment solution further comprises at least one humectant. The humectant can be chosen from propylene glycol, ethylene glycol, polyethylene glycol (various) or derivatives of those compounds. For some embodiments, propylene glycol is the humectant. The presence of the humectant is believed to improve the stain protecting effects of the pretreatment solution.

If used, the amount of the at least one humectant can be from 0.1% to 15% by weight of the pretreatment solution.

In some other optional embodiments, the aqueous pretreatment solution further comprises at least one finishing agent. The at least one finishing agent comprises fragrances, surfactants, preservatives, biocides, dyes and rheology modifiers. The addition of fragrances is beneficial in reducing the appearance of a vinegar smell from the acetic acid, such as water-soluble lavender oil and other essential oils.

If used, the amount of finishing agent can be from 0.01% to 1% by weight of the pretreatment solution.

The balance of the solution is water.

Still another embodiment is directed to a concentrated pretreatment comprising a mixture of 40 parts to 70 parts by weight of at least one multivalent cationic salt, optionally 0.1 parts to 5 parts by weight a blocked isocyanate crosslinking agent, and 3 parts to 40 parts by weight of a waterborne resin. This concentrate can be prepared beforehand and then diluted with water anywhere. The diluted concentrated pretreatment solution can comprised of 1 part by weight pretreatment concentrate to 5 parts by weight water to 1 part by weight pretreatment concentrate to 0.1 parts by weight water. The concentrated pretreatment can be easily shipped and the aqueous pretreatment solution can be prepared on site from the concentrate.

The aqueous pretreatment solution can be easily prepared. This pretreatment solution does not require special mixing steps since there is no reactivity or solubility issues. In one embodiment, the salt is diluted in the water before adding the other ingredients, and then the other ingredients are added slowly with mixing so as to not "shock" to the ingredients. A person having skill in this art would know how to perform this standard methodology of mixing ingredients.

In some optional embodiments, the cotton fabric can be contacted with an aqueous sodium hydroxide or sodium carbonate solution before the contacting with aqueous pretreatment solution. This contacting can include submerging/dipping the fabric in the solution and then wringing as well as other known fabric/aqueous solution contacting techniques. This can be done manually, or through use of industrial textile extractor. A desirable pickup percentage of the sodium hydroxide or sodium carbonate onto the fabric (i.e., the weight of fabric plus the weight of sodium hydroxide or sodium carbonate solution divided by weight of fabric can be from 1% to 25% by weight. The percent of the sodium hydroxide or sodium carbonate in the aqueous solution can be in the range from 1% to 10% by weight. The sodium hydroxide or sodium carbonate contacting allows the later applied pretreatment solution to better adhere or bond or attract to the fabric. In some other optional embodiments, a wetting agent may be added to the sodium hydroxide or sodium carbonate solution to keep loose dye suspended during washing, thus preventing backstaining while aiding the removal of excess dye color. Synthrapol™ wetting agent is one example of such wetting agents. After the contacting with the aqueous sodium hydroxide or sodium carbonate solution, some embodiments additionally rinse the fabric with water. One exemplary mechanical means of drying is the use of an industrial centrifugal extraction dryer.

After the optional contacting with the aqueous sodium hydroxide or sodium carbonate solution (with or without the subsequent water rinsing step), but before the contacting with aqueous pretreatment solution, the fabric is dried to remove the excess water from the fabric, leaving sodium hydroxide or sodium carbonate on the cotton fabric. The drying can be carried out by any conventional means, such by air drying or using a heat source such as conveyor/tunnel dryer, forced air, or heat press.

After the pretreatment solution is made, it is contacted to the cotton fabric or a portion thereof. The contacting can be applying or coating the cotton fabric or a portion thereof. In some embodiments, this can be carried out by spraying or dipping and then wringing the fabric with the solution. In other embodiments, this cotton fabric can be submerged as part of an open-width fabric finishing process where the fabric is run continuously through a pretreat bath, then mechanically wrung dry before being compacted and sewn into a finalized garment. In one embodiment, a "washer/extractor" machine may be used to contact the solution to the cotton fabric. Such machines are found, for example, in hotels, prisons, schools, and the like, typically for clothing and bedding. An example of one washer/extractor suitable for use in the present invention is the UniMac UW/UY series high performance industrial washer/extractor, the B&C Technologies SI series, and the Girbau HS/RM series. The washer/extractor includes a control apparatus, which is preferably a computer and accompanying software that can be programmed by the user to achieve the desired results. In one embodiment, the control apparatus and software can be controlled either by direct inputs on the apparatus itself, or through a wireless network. Examples of suitable control apparatus and software include Unimac and Unilinc systems for the UniMac washer/extractor; B&C EL-6 for the B&C SI Series, and Girbau Inteli Control for the Girbau HS/RM series. In another embodiment, an industrial exhaustion/dying machine may be used. An example of such a machine is made and sold by Tonello SRL (Sarcedo, Italy) where the pretreatment solution is sprayed onto the tumbling garments.

After the contacting step, the cotton fabric is dried to remove the aqueous component from cotton fabric now coated with the non-aqueous ingredients of the solution. In some embodiments, the drying step is air drying, heat pressing, or drying in a garment dryer. The preferred drying step is drying in a garment dryer. The drying in a garment dryer is carried out for sufficient time to remove the water from the cotton fabric.

In some embodiments, an optional heat pressing step is carried out between the drying in a clothing dryer and the digitally printing step. If used a heat pressing step can be carried out for 1-20 seconds at 250 to 400 degrees F. and at 5-80 psi prior to printing.

In some embodiments, the digital printing step is carried out on a Direct-To-Garment (DTG) digital printer. In some embodiments using a DTG digital printer, a white underbase is first printed followed by color printing with one or more colors.

Any suitable waterborne ink that is useful for printing on cotton fabric can be used.

The digitally printed cotton fabric can be heat cured. FIREBIRD Ink for DTG from Eastern Tech Company of Milford, Conn., Epson F2000 and Brother GTX ink are commercially available DTG inks suitable for printing on cotton fabrics that can be used immediately without air drying. A person skilled in this art would know how to perform this standard methodology of digital printing, especially with a DTG digital printer.

After digital printing, the digitally printed cotton fabric can be optionally allowed to sit for 30 minutes to 24 hours to allow the ink to fix on the cotton fabric. Also, after this sitting time, the printed cotton fabric can be optionally heat pressed for 15-60 seconds at 250-400 degrees F. and at 5-80 psi after sifting to prepare it for marketing.

EXAMPLES

Example 1

The following is an example of one embodiment of this process.

Ten men's t-shirts (Fruit of the Loom™ Brand, Model 3930R-HD Cotton 100% Cotton Men's T-Shirt, 5.0 Ounce in Black) were first pre-washed in an aqueous solution of 5% by weight and 95% by weight water in a Centrifugal Extractor was set to 1000 rpm and allowed to run for 10 minutes. The Garments were wet to the touch, but not dripping. The extracted Pre-wash Aqueous Solution liquid was retained in a container that may be re-used for future processing. After this pre-wash, 1 Gallon of Water (approximately 10 lbs.) was added to the perforated basket of the Extractor with the Garments still inside. The Centrifugal Extractor was again set to 1000 rpm and allowed to run for 10 minutes. The Garments were wet to the touch, but not dripping. The extracted water was discarded. The Garments were then placed inside of a Whirlpool Industrial Dryer machine and run at medium heat for 20 minutes. The Garments were completely dry to the touch.

An aqueous pretreatment solution was prepared in a multi-gallon container, comprising: A) 50% by weight Calcium Nitrate; B) 12.5% by weight NeoRez (R) R-960 from DSM Coating Resins LLC; C) 2.5% by weight Ruco-Guard XCR from Rudolf Group and 35% by weight water. The 10 pieces of Garments (approximately 5 lbs.) were transferred from the Dryer machine to the perforated basket of a Bock Centrifugal Extractor. 1 Gallon of Aqueous solution (approximately 11.5 lbs.) was added so that the Garments were fully immersed. The Centrifugal Extractor was set to 1000 rpm and allowed to run for 15 minutes. The Garments were wet to the touch, but not dripping. The extracted aqueous solution was retained in a container that may be re-used for future processing. The Centrifugal Extractor was set to 1000 rpm and allowed to run for 15 minutes. The Garments were wet to the touch, but not dripping. The extracted aqueous solution was retained in a container that may be re-used for future processing. The garments were then placed inside of a Whirlpool Industrial Dryer machine and run at medium heat for 30 minutes. The Garments were completely dry to the touch.

Each garment then was loaded onto a Brother® GTX™ Direct-To-Garment Printer. Using Graphix Lab Software, a digital graphic was uploaded with settings set at Highlight Level 4 and Mask Level 4. The Printer first prints a white ink underbase, followed by a CMYK color ink pass, as is well known for people familiar to the art.

After Printer completes the printing of the graphic, the area of the garment with ink is then heat cured using an Adelco Dual Conveyor Dryer (DL-180-3), the garment was heat-cured at 350 degrees F. temperature for 45 seconds dwell time.

Examples 2-6

The following Table Examples illustrate additional embodiment of the invention. In these Examples, various embodiments of the composition of the invention were prepared and utilized in the same manner as outlined in Example 1 above.

| Component | Trade Name | Example 2 | Example 3 | Example 4 | Example 5 | Example 6 |
|---|---|---|---|---|---|---|
| Ca(NO$_3$)$_2$ | | 20 | 20 | 20 | 40 | 40 |
| Blocked Isocyante | Ruco-Guard XCR | | | 1.5 | | 1.5 |
| Waterborne Resin | NeoRez R-960 | | 10 | 10 | 10 | 10 |
| Print Vibrancy | | 5 | 7 | 8 | 9 | 8 |
| Wash Result | | 1 | 8 | 7 | 8 | 9 |

The Table above illustrates examples containing various percentages, based on total weight, of each component of the present invention, with the balance being water. Each of the above Examples 2-6 were prepared and processed as described for Example 1 above, and then evaluated for Print Vibrancy and Wash Result, each of which is presented on a 1-10 visual scale, with a higher value depicting a better result. As shown in the Table above, Examples 5 and 6 gave the best results in terms of print vibrancy and wash result.

The present disclosure is further illustrated by the following Embodiments:

Embodiment 1

A process for printing on cotton fabric comprising (1) contacting cotton fabric with an aqueous solution comprising (A) 40% to 70% by weight of at least one multivalent cationic salt; (B) optionally 0.1% to 5% by weight of a blocked isocyanate crosslinking agent, and (C) 3% to 40% by weight of a waterborne resin, all percentages based on the weight of the aqueous solution; (2) drying the cotton fabric to remove the water from the cotton fabric; and (3) digitally printing the pretreated and coated cotton fabric with a water-based textile ink.

Embodiment 2

The process of Embodiment 1, wherein the cotton fabric is clothing.

Embodiment 3

The process of Embodiment 2, wherein the clothing is a t-shirt.

Embodiment 4

The process of any of Embodiments 1-3, wherein the at least one multivalent cationic salt has a cation that comprises a multivalent cation of element Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb, or a combination of at least one of the foregoing.

Embodiment 5

The process of Embodiment 4, wherein the cation is calcium.

Embodiment 6

The process of Embodiment 4, wherein the at least one multivalent cationic salt comprises from the group consisting of calcium nitrate, calcium nitrate hydrate, calcium nitrate tetrahydrate, calcium ammonium nitrate, calcium chloride, or a combination comprising at least one of the foregoing.

Embodiment 7

The process of any of Embodiments 4-6, wherein the amount of the at least one multivalent cationic salt is 47% to 62% by weight, based on the weight of the aqueous solution.

Embodiment 8

The process of any of Embodiments 1-7, wherein the isocyanate group in the blocked isocyanate crosslinking agent is blocked di-polyisocyanate, blocked tri-polyisocyanate, and combinations thereof.

Embodiment 9

The process of Embodiment 8, wherein the isocyanate group in the blocked isocyanate crosslinking agent is a trifunctional trimethylolpropane (TMP) of tolune diisocyanate (TDI); hexamethylene diisocyanate (HDI), hydrogenated xylylene diisocyanate (H$_6$XDI), isophorone diisocyanate (IPDI), or dicyclohexylmethane diisocyanate (H$_{12}$MDI), or a combination comprising at least one of the foregoing.

Embodiment 10

The process of Embodiment 8, wherein the blocking agent is diethyl malonate (DEM), diisopropyl amine (DIPA), 1,2,4-triazol (TRIA), 3,5-dimethylpyrazol (DMP) and butanoneoxime (MEKO).

Embodiment 11

The process of Embodiment 8, wherein the blocked isocyanate crosslinking agent is a blocked aliphatic isocyanate.

Embodiment 12

The process of any of Embodiments 8-11, wherein the amount of the blocked isocyanate crosslinking agent is from 1% to 4% by weight, based on the weight of the aqueous solution.

Embodiment 13

The process of any of Embodiments 1-12, wherein the waterborne resin is an acrylic resin or emulsion, a polyurethane resin or emulsion, an acrylic-vinylidene chloride copolymers, a styrene butadiene rubber latex, an acrylic styrene emulsion, a vinyl acrylic emulsion, a vinyl acetate ethylene (VAE) copolymer emulsion or combinations of one or more of the foregoing.

Embodiment 14

The process of Embodiment 13, wherein the amount of the waterborne resin is 4% to 25% by weight, based on the weight of the aqueous solution.

Embodiment 15

The process of any of Embodiments 1-14, wherein the drying step is air drying, heat pressing, or drying in a clothing dryer.

Embodiment 16

The process of Embodiment 15, wherein the drying step is drying in a clothing dryer.

Embodiment 17

The process of Embodiment 16, wherein the drying in a clothing dryer is carried out for sufficient time to remove the water from the cotton fabric.

Embodiment 18

The process of Embodiment 17, wherein a heat pressing step is carried out between the drying in a clothing dryer and the digitally printing step.

Embodiment 19

The process of Embodiment 18, wherein a heat pressing step is carried out for 5-20 seconds at 250-400 degrees F. and at 5-80 psi within one hour of printing.

Embodiment 20

The process of any of Embodiments 1-19, wherein the digitally printing step is carried out on a direct to garment printer.

Embodiment 21

The process of Embodiment 20, wherein a white underbase is first printed followed by color printing with one or more colors.

Embodiment 22

The process of Embodiment 21, wherein the digitally printed cotton fabric is allowed to sit for 30 minutes to 24 hours to allow the ink to fix on the cotton fabric.

Embodiment 23

The process of Embodiment 21, wherein the digitally printed cotton fabric is heat pressed for 15-60 seconds at 280-400 degrees F. and at 5-80 psi after sitting.

Embodiment 24

The process of any of Embodiments 1-20, wherein the fabric is contacted with an aqueous sodium hydroxide solution or an aqueous sodium carbonate solution before the contacting with the aqueous pretreatment solution.

Embodiment 25

A process for printing on cotton fabric comprising (1) contacting the cotton fabric with an aqueous sodium hydroxide solution or an aqueous sodium carbonate solution; (2) rinsing the fabric with water; (3) drying the fabric; (4) contacting cotton fabric with an aqueous solution comprising (A) 40% to 70% by weight of at least one multivalent cationic salt; (B) optionally 0.1% to 5% by weight of a blocked isocyanate crosslinking agent, and (C) 3% to 40% by weight of a waterborne resin, all percentages based on the weight of the aqueous solution; (5) drying the cotton fabric to remove the water from the cotton fabric; and (6) digitally printing the pretreated and coated cotton fabric with a water-based textile ink.

Embodiment 26

An aqueous solution for the pretreatment of cotton fabrics comprising (A) 40% to 70% by weight of at least one multivalent cationic salt; (B) optionally 0.1% to 5% by weight of a blocked isocyanate crosslinking agent, and (C) 3% to 40% by weight of a waterborne resin, all percentages based on the weight of the aqueous solution.

Embodiment 27

The aqueous solution of Embodiment 26, wherein the at least one multivalent cationic salt has a cation that comprises a multivalent cation of element Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb, or a combination of at least one of the foregoing.

Embodiment 28

The aqueous solution of Embodiment 27, wherein the cation is calcium.

Embodiment 29

The aqueous solution of Embodiment 28, wherein the at least one multivalent cationic salt comprises from the group consisting of calcium nitrate, calcium nitrate hydrate, calcium nitrate tetrahydrate, calcium chloride, or a combination comprising at least one of the foregoing.

Embodiment 30

The aqueous solution of any of Embodiments 25-27, wherein the amount of the at least one multivalent cationic salt is 47% to 62% by weight, based on the weight of the aqueous solution.

Embodiment 31

The aqueous solution of any of Embodiments 26-30, wherein the isocyanate group in the blocked isocyanate crosslinking agent is blocked di-polyisocyanate, blocked tri-polyisocyanate, and combinations thereof.

Embodiment 32

The aqueous solution of Embodiment 31 wherein the isocyanate group in the blocked isocyanate crosslinking agent is a trifunctional trimethylolpropane (TMP) of tolune diisocyanate (TDI); hexamethylene diisocyanate (HDI), hydrogenated xylylene diisocyanate ($H_6XDI$), isophorone diisocyanate (IPDI), or dicyclohexylmethane diisocyanate ($H_{12}MDI$), or a combination comprising at least one of the foregoing.

Embodiment 33

The aqueous solution of Embodiment 31, wherein the blocking agent is diethyl malonate (DEM), diisopropyl amine (DIPA), 1,2,4-triazol (TRIA), 3,5-dimethylpyrazol (DMP) and butanoneoxime (MEKO).

Embodiment 34

The aqueous solution of Embodiment 31, wherein the blocked isocyanate crosslinking agent is a blocked aliphatic isocyanate.

Embodiment 35

The process of any of Embodiments 31-34, wherein the amount of the blocked isocyanate crosslinking agent is from 1% to 4% by weight, based on the weight of the aqueous solution.

Embodiment 36

The aqueous solution of any of Embodiments 26-35, wherein the waterborne resin is an acrylic resin or emulsion, a polyurethane resin or emulsion, an acrylic-vinylidene chloride copolymers, a styrene butadiene rubber latex, an acrylic styrene emulsion, a vinyl acrylic emulsion, a vinyl acetate ethylene (VAE) copolymer emulsion or combinations of one or more of the foregoing.

Embodiment 37

The aqueous solution of Embodiment 36, wherein the amount of the waterborne resin is 4% to 25% by weight, based on the weight of the aqueous solution.

Embodiment 38

A concentrated pretreatment comprising a mixture of 40 parts to 70 parts by weight of at least one multivalent cationic salt, optionally 0.1 parts to 5 parts by weight a blocked isocyanate crosslinking agent, and 3 parts to 40 parts by weight of a waterborne resin.

Embodiment 39

A diluted concentrated pretreatment solution comprised of the concentrate of Embodiment 38 diluted with water anywhere from 1 part by weight pretreatment concentrate to 5 parts by weight water to 1 part by weight pretreatment concentrate to 0.1 parts by weight water.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An aqueous solution for the pretreatment of cotton fabrics consisting essentially of A) 40% to 70% by weight of at least one multivalent cationic salt; (B) 0.1% to 5% by weight of a blocked isocyanate crosslinking agent, wherein the isocyanate group in the blocked isocyanate crosslinking agent is a trifunctional trimethylolpropane (TMP) of toluene diisocyanate (TDI); hexamethylene diisocyanate (HDI), hydrogenated xylylene diisocyanate ($H_6XDI$), isophorone diisocyanate (IPDI), or dicyclohexylmethane diisocyanate ($H_{12}NDI$), or a combination thereof, and (C) 3% to 40% by weight of a waterborne resin, all percentages based on the weight of the aqueous solution.

2. The aqueous solution of claim 1, wherein the at least one multivalent cationic salt has a cation that comprises a multivalent cation of element Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb, or a combination thereof.

3. The aqueous solution of claim 2, wherein the cation is calcium.

4. The aqueous solution of claim 3 wherein the at least one multivalent cationic salt comprises from the group consisting of calcium nitrate, calcium nitrate hydrate, calcium nitrate tetrahydrate, calcium chloride, or a combination thereof.

5. The aqueous solution of claim 1, wherein the amount of the at least one multivalent cationic salt is 47% to 62% by weight, based on the weight of the aqueous solution.

6. The aqueous solution of claim 1, wherein the amount of the blocked isocyanate crosslinking agent is from 1% to 4% by weight, based on the weight of the aqueous solution.

7. The aqueous solution of claim 1, wherein the waterborne resin is an acrylic resin or emulsion, a polyurethane resin or emulsion, an acrylic-vinylidene chloride copolymers, a styrene butadiene rubber latex, an acrylic styrene emulsion, a vinyl acrylic emulsion, a vinyl acetate ethylene (VAE) copolymer emulsion or a combination thereof.

8. The aqueous solution of claim 7, wherein the amount of the waterborne resin is 4% to 25% by weight, based on the weight of the aqueous solution.

9. A process for printing on cotton fabric consisting essentially of (1) contacting the cotton fabric with an aqueous sodium hydroxide solution or an aqueous sodium carbonate solution; (2) drying the fabric; (3) rinsing the fabric with water; (4) drying the fabric: (5) contacting cotton fabric with an aqueous solution comprising (A) 40% to 70% by weight of at least one multivalent cationic salt; (B) 0.1% to 5% by weight of a blocked isocyanate crosslinking agent, wherein the isocyanate group in the blocked isocyanate crosslinking agent is a trifunctional trimethylolpropane (TMP) of toluene diisocyanate (TDI); hexamethylene diisocyanate (HDI), hydrogenated xylylene diisocyanate ($H_6XDI$), isophorone diisocyanate (IPDI), or dicyclohexylmethane diisocyanate (HINDI), or a combination thereof; and (C) 3% to 40% by weight of a waterborne resin, all percentages based on the weight of the aqueous solution; (6) drying the cotton fabric to remove the water from the cotton fabric; and (7) digitally printing the pretreated and coated cotton fabric with a water-based textile ink.

10. A process for printing on cotton fabric consisting essentially of (1) contacting cotton fabric with an aqueous solution comprising (A) 40% to 70% by weight of at least one multivalent cationic salt; (B) 0.1% to 5% by weight of a blocked isocyanate crosslinking agent, wherein the isocyanate group in the blocked isocyanate crosslinking agent is a trifunctional trimethylolpropane (TMP) of toluene diisocyanate (TDI); hexamethylene diisocyanate (HDI), hydrogenated xylylene diisocyanate ($H_6XDI$), isophorone diisocyanate (IPDI), or dicyclohexylmethane diisocyanate (HINDI), or a combination thereof; and (C) 3% to 40% by weight of a waterborne resin, all percentages based on the weight of the aqueous solution; (2) drying the cotton fabric to remove the water from the cotton fabric; and (3) digitally printing the pretreated and coated cotton fabric with a water-based textile ink.

11. The process of claim 10, wherein the cotton fabric is clothing.

12. The process of claim 11, wherein the clothing is a t-shirt.

13. The process of claim 10, wherein the at least one multivalent cationic salt has a cation that comprises a multivalent cation of element Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn Pb, or a combination thereof.

14. The process of claim 13, wherein the cation is calcium.

15. The process of claim 13, wherein the at least one multivalent cationic salt comprises from the group consisting of calcium nitrate, calcium nitrate hydrate, calcium nitrate tetrahydrate, calcium ammonium nitrate, calcium chloride, or a combination thereof.

16. The process of any of claim 13, wherein the amount of the at least one multivalent cationic salt is 47% to 62% by weight, based on the weight of the aqueous solution.

17. The process of claim 10, wherein the amount of the blocked isocyanate crosslinking agent is from 1% to 4% by weight, based on the weight of the aqueous solution.

18. The process of claim 10, wherein the waterborne resin is an acrylic resin or emulsion, a polyurethane resin or emulsion, an acrylic-vinylidene chloride copolymers, a styrene butadiene rubber latex, an acrylic styrene emulsion, a vinyl acrylic emulsion, a vinyl acetate ethylene (VAE) copolymer emulsion or a combination thereof.

19. The process of claim 18, wherein the amount of the waterborne resin is 4% to 25% by weight, based on the weight of the aqueous solution.

20. The process of claim 10, wherein the drying step is air drying, heat pressing, or drying in a clothing dryer.

21. The process of claim 20, wherein the drying step is drying in a clothing dryer.

22. The process of claim 21, wherein the drying in a clothing dryer is carried out for sufficient time to remove the water from the cotton fabric.

23. The process of claim 22, wherein a heat pressing step is carried out between the drying in a clothing dryer and the digitally printing step.

24. The process of claim 23, wherein a heat pressing step is carried out for 5-20 seconds at 280-400 degrees F. and at 5-80 psi within one hour of printing.

25. The process of claim 10, wherein the digitally printing step is carried out on a direct to garment printer.

26. The process of claim 25, wherein a white under base is first printed followed by color printing with one or more colors.

27. The process of claim 10, wherein the digitally printed cotton fabric is heat pressed for 15-60 seconds at 280-400 degrees F. and at 5-80 psi after sitting.

28. The process of claim 10, wherein the fabric is contacted with an aqueous sodium hydroxide solution or an aqueous sodium carbonate solution before the contacting with the aqueous solution.

* * * * *